(12) United States Patent
Morrison

(10) Patent No.: US 7,657,330 B2
(45) Date of Patent: Feb. 2, 2010

(54) OPTICAL RING ARCHITECTURE

(75) Inventor: Brian D. Morrison, Hopkinton, MA (US)

(73) Assignee: Parker-Hannifin Corporation, Cleveland, OH (US)

( * ) Notice: Subject to any disclaimer, the term of this patent is extended or adjusted under 35 U.S.C. 154(b) by 883 days.

(21) Appl. No.: 10/373,272

(22) Filed: Feb. 24, 2003

(65) Prior Publication Data
US 2004/0052450 A1  Mar. 18, 2004

Related U.S. Application Data

(63) Continuation-in-part of application No. 10/039,044, filed on Jan. 3, 2002, now Pat. No. 6,600,972, which is a continuation of application No. 09/330,405, filed on Jun. 11, 1999, now Pat. No. 6,356,809.

(60) Provisional application No. 60/359,028, filed on Feb. 22, 2002, provisional application No. 60/358,914, filed on Feb. 22, 2002, provisional application No. 60/429,962, filed on Nov. 29, 2002.

(51) Int. Cl.
 *H04B 10/20* (2006.01)
 *G02F 1/00* (2006.01)
 *H04J 14/00* (2006.01)
(52) U.S. Cl. .................. 700/19; 398/2; 398/3; 398/59; 398/70; 398/71
(58) Field of Classification Search .................. 700/19; 370/452; 398/3, 9, 110; 340/539.1; 356/73
See application file for complete search history.

(56) References Cited

U.S. PATENT DOCUMENTS

| 4,422,180 | A  | * | 12/1983 | Wendt ........................ 398/110 |
| 4,866,704 | A  | * | 9/1989  | Bergman .................... 370/452 |
| 5,598,456 | A  |   | 1/1997  | Feinberg |
| 6,118,521 | A  | * | 9/2000  | Jung et al. .................... 356/73 |
| 6,356,627 | B1 | * | 3/2002  | Hayball et al. ......... 379/112.01 |
| 6,400,476 | B1 | * | 6/2002  | Arecco .......................... 398/9 |
| 6,661,972 | B1 | * | 12/2003 | Arecco .......................... 398/3 |
| 6,822,565 | B2 | * | 11/2004 | Thomas et al. ........... 340/539.1 |

FOREIGN PATENT DOCUMENTS

WO  00 77638  12/2000

OTHER PUBLICATIONS

International Search Report from corresponding International Application No. PCT/US03/05248.

* cited by examiner

*Primary Examiner*—Albert DeCady
*Assistant Examiner*—Sunray R Chang
(74) *Attorney, Agent, or Firm*—John A. Molnar, Jr.

(57) ABSTRACT

A system and method for providing a network that includes at least two microprocessor-controlled devices that include a first microprocessor-controlled device and a distinct second microprocessor-controlled device, and at least two bi-directional fiber optic cables to provide a communicative ring amongst the at least two microprocessor controlled devices by connecting the at least two microprocessor-controlled devices in a daisy-chain, where the first microprocessor-controlled device and the distinct second microprocessor-controlled device communicate via at least two of the bi-directional fiber optic cables.

25 Claims, 9 Drawing Sheets

OPTICAL RING ARCHITECTURE

CLAIM OF PRIORITY

This application claims priority to U.S. Ser. No. 60/359,028 filed on Feb. 22, 2002, the contents of which are incorporated herein in their entirety, and also claims priority to U.S. Ser. No. 60/358,914, filed on Feb. 22, 2002, the contents of which are incorporated herein by reference in their entirety, and claims priority to U.S. Ser. No. 60/429,962 filed on Nov. 29, 2002, the contents of which are incorporated herein by reference in their entirety, and this application is a continuation-in-part of U.S. Ser. No. 10/039,044 entitled "Electrostatically Shielded Processing Module," filed on Jan. 3, 2002, the contents of which are incorporated herein by reference in their entirety, where U.S. Ser. No. 10/039,044 is a continuation of U.S. Ser. No. 09/330,405 entitled "Electro-statically Shielded Processing Module," filed on Jun. 11, 1999, and now U.S. Pat. No. 6,356,809, which names Brian D. Morrison and Paul A. Connolly as inventors, the contents of which are also incorporated herein by reference in their entirety.

CROSS-REFERENCE TO RELATED APPLICATIONS

This patent application is co-pending with a related patent application entitled "Optical Connector" by the same inventor as this patent application, and filed on the same day as this application (Feb. 24, 2003), the contents of which are incorporated herein in their entirety.

BACKGROUND (1.) Field

The disclosed methods and systems relate generally to fiber optical communications systems, and more particularly to methods and systems for providing a fiber optic ring.

(2.) Description of Relevant Art

Security and/or surveillance is a seemingly continuous problem which can experience increased emphasis based on local and/or global security threats. The demand for security can also be understood to also increase based on technological advances in networking and/or telecommunications which allow entities to construct and maintain remote facilities that may be unmanned, for example. Costs associated with providing personnel to monitor otherwise remote, unmanned locations, and/or locations at which little if no activity is otherwise expected, can be burdensome to entities that wish to expand and/or are otherwise intertwined with an industry that can be associated with distributed facilities and/or services.

Further, measurement systems that can be distributed, regardless of their application to security systems or otherwise, can be compromised by a failure in one or more components and/or one or more of the communicative links. A measurement system component and/or communications link failure may remain undetected and/or can cause significant degradation in overall system performance.

SUMMARY

Disclosed are systems and methods that include at least two microprocessor-controlled devices that include at least a first microprocessor device and a distinct second microprocessor-controlled device, and, at least two bi-directional fiber optic cables to provide a communicative ring amongst the at least two microprocessor-controlled devices by connecting the at least two microprocessor-controlled devices in a daisy-chain, where the first microprocessor-controlled device and the distinct second microprocessor-controlled device communicate (e.g., optical network message data) via at least two of the bi-directional fiber optic cables. The fiber optic ring can include a first communicative direction and a second communicative direction, where the at least two microprocessor devices communicate along the first and the second communicative directions. The systems and methods can also include an interface between the two or more microprocessor controlled devices and the two or more bi-directional fiber optic cables, where the interface can include an electro-optical device, such as a photodiode.

The two or more microprocessor controlled devices can include one or more of a processing system, a measurement system, a sensor, a mechanical sensor, an analog sensor, a digital sensor (e.g., digital camera), a fiber optic sensor, a fuel tank sensor, and an infrared sensor, although other systems, devices, and/or sensors can be understood herein to be a microprocessor-controlled device. Further, as provided herein, a microprocessor-controlled device may not include a microprocessor, but may interface to, directly or indirectly, a microprocessor.

The communications can be transmitted in accordance with one or more protocols and/or standards that can include, for example, TCP/IP, Ethernet, and a fieldbus protocol.

The methods and systems can also include a power supply, and in some embodiments, two or more power supplies, such that the two or more power supplies can have a communicative connection to at least one of the two or more microprocessor controlled devices. In an embodiment, the power supplies can include an analog, digital, and/or laser power amplifier/diode, and the communicative connection between the microprocessor-controlled devices and the power supplies can include copper cable and/or fiber optic cable. A fiber optic cable can be understood herein to include a fiber core (e.g., glass) and a cladding layer and/or shielding.

In one embodiment, the two or more microprocessor-controlled devices can be associated with microprocessor instructions to identify a source identification (ID) and a destination ID associated with the communications (e.g., network message data), whether the network message data is transmitted and/or received. Accordingly, such microprocessor instructions can reside on one or more microprocessors that may be associated with the two or more microprocessor-controlled devices. The microprocessor instructions can also determine whether received data is received in a first direction and in a second direction along the ring, and/or to transmit data in a first direction and in a second direction along the ring. In some embodiments, the microprocessor instructions can count, track, and/or otherwise detect received data based on discrete events (e.g., transmissions), and further, can provide one or more silent alarms and/or alarm messages and/or one or more non-silent alarms and/or alarm messages based on the counted, tracked, and/or detected data.

In the disclosed methods and systems, the two or more microprocessor-controlled devices can communicate with at least one microprocessor-controlled device outside the ring, and can utilize wire and/or wireless communications protocols and/or means that can include, for example, satellite, internet, Ethernet network, and USB, although such examples are provided for illustration and not limitation.

The disclosed methods and systems also include methods and systems having two or more microprocessor-controlled devices, the two or more microprocessor-controlled devices including: at least one camera, at least one switch, and at least one microprocessor device having a display, and, two or more bi-directional fiber optic cables to provide a communicative ring amongst the two or more microprocessor-controlled devices by connecting the two or more microprocessor-controlled devices in a daisy-chain, where the two or more microprocessor-controlled devices communicate optical data via two or more of the bi-directional fiber optic cables. The camera can be a video camera that can be networked, and the switch can be a message switch.

The methods and systems can also include at least one illumination source that can be associated with at least one of the two or more microprocessor controlled devices. At least one of the two or more microprocessor-controlled devices can be at least partially enabled and/or at least partially disabled, based on a user input that can include a personal identification number (PIN), an access code, and/or biometric data.

In embodiments that use at least one camera, the camera(s) can be associated with at least one illumination source, and the illumination source(s) can be activated based on data from the at least one camera. For example, the illumination source(s) can be activated periodically at given intervals, based on commands provided from the display(s), and/or automatically based on microprocessor instructions associated with the camera and/or data, such as time and/or motion. In some embodiments, the illumination source may be activated by a command provided by a microprocessor-controlled device outside the network. Accordingly, the camera(s) can be associated with microprocessor-executable instructions for detecting motion, where the camera(s) can provide image data to the one or more microprocessor devices having the display, when motion is detected, and an operator at the display can provide a command to be communicated to the illumination source to illuminate an area associated with the camera(s). Those or ordinary skill will understand that such communications between the illumination source and the display can be communicated via the camera, or directly. Further, the camera may additionally and/or optionally provide the image data to a microprocessor-controlled device that may be outside the ring network. In some embodiments, the camera can provide a series of video images. In some embodiments, the camera(s) can be directed to a specified area via commands provided by an operator at the display.

Other objects and advantages will become apparent hereinafter in view of the specification and drawings.

DESCRIPTION

Figure 1:
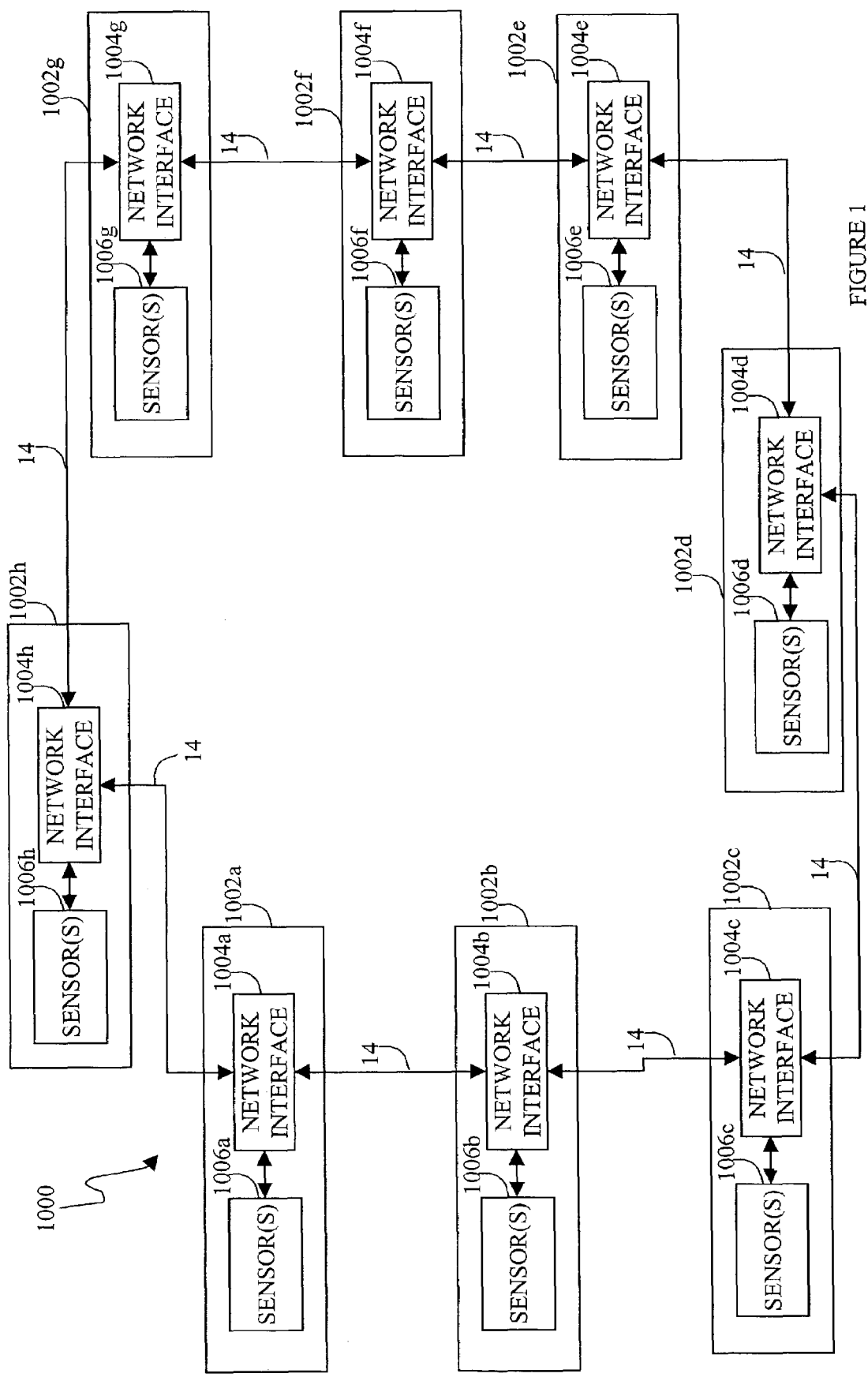
FIG. 1 illustrates an optical fiber ring/network as disclosed herein.

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the disclosed systems or methods.

The disclosed methods and systems can employ bi-directional fiber optic cables to form a fiber optic ring to provide a network of "nodes" upon which data can be communicated in two directions (bi-directional) amongst two or more such nodes. A node may thus include one or more "node devices" and a "node microprocessor," and thus a node can be understood herein to be a "microprocessor-controlled device." The node microprocessor can include instructions to interface the node device(s) to the fiber optic communications network/ring such that communications from a node device(s) can be communicated in two directions along the fiber optic ring. Node devices can include processing systems, measurement systems, imaging systems (e.g., video camera(s)), sensors, and/or other microprocessor-controlled devices, and can include mechanical sensors, analog and/or digital sensors, fiber optic sensors, infrared sensors, video sensors, and/or other types of sensors, where such node devices can communicate directly and/or indirectly with the node microprocessor, and where such examples of node devices are provided for illustration and not limitation. It can be understood that the node devices can include a microprocessor that may be different from the node microprocessor, and thus a node may include more than one microprocessor.

Accordingly, the disclosed methods and systems include a configuration in which two or more nodes can be connected in a daisy chain configuration to provide a ring that allows nodes/node devices to be connected in series along the fiber optic network/ring using two or more bi-directional fiber optic cables. In such a configuration, a first node/node device on the fiber optic ring can communicate with a second node/node device using two distinct communications paths, where the first path traverses the ring in a first direction, and the second path traverses the ring in a second direction. One of ordinary skill will understand that the first and second communications paths can include other nodes. In one exemplary embodiment, the fiber optic ring can employ or otherwise be in compliance with standards/protocols such as TCP/IP, Ethernet, and/or a fieldbus protocol, although such examples are provided for illustration and not limitation, and other standard, custom, proprietary, and/or non-proprietary protocols and/or standards can be used to facilitate communications along the fiber optic ring.

Because the communicative paths between nodes are fiber optic, the nodes and/or node devices can interface to the fiber optic communications ring using an electro-optical conversion interface, scheme, and/or means that can allow for fiber optic communications from the fiber optic ring to be converted to electrical (analog and/or digital) data communications (and hence to the node device(s)), and similarly, can allow for electrical analog and/or digital data from the node devices to be converted to optical data for transmission on the fiber optic ring. The interface can additionally and/or optionally process (e.g., format, parse, etc.) the received and/or transmitted data in accordance with the protocols, standards, etc., associated with the fiber optic ring, for transmission in two directions along the fiber optic ring. In one embodiment, an interface between a node and the fiber optic ring can include a connector such as the optical connector described in the co-pending application entitled "Optical Connector," although such connector is merely illustrative of one connector, and other connectors may be used without departing from the scope of the disclosed methods and systems. Further, those of ordinary skill will understand that if a node device is a fiber optic device, the interface may not include an electro-optical conversion scheme.

In some embodiments, one or more of such node devices and/or nodes can additionally and/or optionally communicate with one or more other node devices that may be outside the ring. For example, one or more nodes/node devices from a first fiber optic ring may communicate with one or more nodes/node devices associated with a second, third, etc., fiber optic ring, and/or nodes/node devices from such first, second, etc., fiber optic ring may otherwise communicate with stand-alone and/or networked microprocessor-controlled devices (e.g., hub, router, server, etc.). Communications between fiber optic ring devices, and devices outside the ring, can use a variety of protocols and communications schemes, including wired and/or wireless communications schemes that include infrared, satellite, Ethernet, internet, USB, etc.

The disclosed methods and systems can thus provide a measurement, security, and/or surveillance system and method that can be associated with and/or relative to a perimeter that can be defined by or otherwise associated with the bi-directional fiber optic ring. In one example, some of the node devices can include "smart" cameras and/or consoles, where "smart" can be understood to include a microprocessor with instructions for controlling the node device and/or processing node device data in the absence of an externally provided (manual, electrically provided, etc.) control and/or processing. The methods and systems disclosed herein may thus be utilized to monitor perimeters associated with, for example, an aircraft, an airport, a ship, a home, a pipeline, and other locations, including indoor and outdoor locations, where perimeter-based monitoring and/or measurement may be desirable. Perimeter-based monitoring can thus be understood herein to be relative to an area that can be associated with a fiber optic communications channel that can be connected in a ring configuration.

FIG. 1 provides an illustration of one perimeter system as disclosed herein that includes nodes 1002a-g connected in a daisy chain configuration through bi-directional fiber optic cables 14 to provide a fiber optic ring/network 1000 as provided herein. As one of ordinary skill will recognize, given the bi-directional fiber optic cables 14, it can be recognized that two communicative paths exist between two of such illustrated nodes 1002a-g. As FIG. 1 illustrates, a node 1002a-g can include a network interface 1004a-g for facilitating communications between a node device 1006a-g, denoted as a sensor(s) 1006a-g, and the network 1000. As provided herein the illustrated network interface 1004a-g may include a microprocessor that can provide features such as the aforementioned node microprocessor, and/or the network interface 1004a-g may include a device such as a photodiode for converting optical energy to electrical energy, and vice-versa, to facilitate communications between the illustrated sensors 1006a-g and the fiber optic network/ring 1000. Those of ordinary skill will thus understand that the illustrated sensors 1006a-c may include the node microprocessor as provided herein when the illustrated network interface 1004a-g may not include a microprocessor. In an embodiment, the network interface 1004a-g can include the node microprocessor, and/or the sensor(s) 1006a-g may additionally and/or optionally include a microprocessor that may provide the features of a node microprocessor as provided herein.

Figure 2:
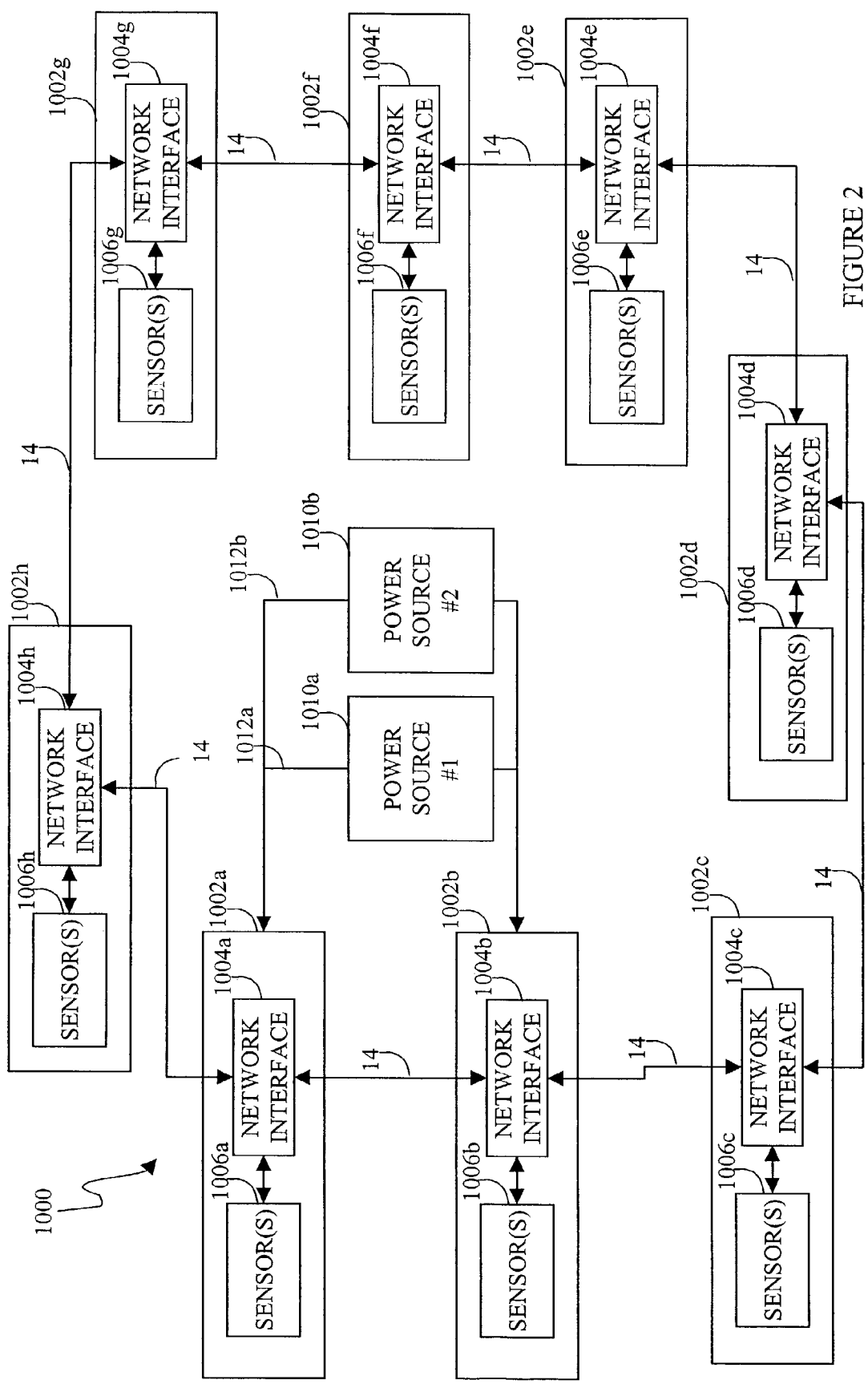
FIG. 2 is an example of another ring architecture.

In a further embodiment of FIG. 1 that is shown in FIG. 2, the fiber optic network/ring can include one or more power sources 1010a-b that can be used to provide power to one or more of the nodes 1002a-g. The power sources 1010a-b can include an analog and/or digital power supply, and/or can include one or more laser power amplifiers/diodes, for example, where such connections 1012a-b between the power sources 1010a-b and the nodes 1002a-g can also be fiber optic. As provided in U.S. Pat. No. 6,356,809, incorporated herein by reference in its entirety, optical power and optical networking can be used, for example, where copper cable may be unavailable and/or undesirable because of lightning, electromagnetic interference, long distances, etc. Power redundancy can be provided, per FIG. 2, using multiple power sources 1010a-b, and accordingly, the methods and systems can include using one or more power sources 1010a-b. In some embodiments, the power sources 1010a-b can be shared by multiple nodes 1002a-g and/or dedicated to an individual node 1002a-g. In some embodiments, multiple power sources 1010a-b can be used in parallel to provide a collective power/energy amount to one or more nodes 1002a-g.

As provided previously herein, the fiber optic network/ring 1000 can use one or more proprietary, non-proprietary, and/or custom standards and/or protocols, including Ethernet, TCP/IP, and/or a fieldbus protocol, although such examples are provided for illustration and not limitation. Accordingly, the nodes 1002a-g, and for example, the node microprocessor, can include instructions for processing received messages in accordance with the network protocols.

Those of ordinary skill will understand that redundancy of the fiber optic ring 1000 can be achieved through the ring architecture and the bi-directional communications capability that can allow, for example, the illustrated sensors 1006a-g to communicate data and/or data messages along two directions and/or paths of the ring. Accordingly, in accordance with protocols, etc., the data messages can include a message identification (ID), a source identification (ID), and a destination identification (ID). The source ID can be associated with a sensor 1006a-g providing (e.g., transmitting) the data, while the destination ID can be associated with a sensor 1006a-g or other network device to receive the data. Other sensors/node devices 1006a-g and/or nodes 1002a-g can accordingly receive the data, determine that the data is not addressed to such device 1006a-g, and pass the data along the ring in accordance with the direction in which the data is being communicated. When the sensor/node devices 1006a-g and/or nodes 1002a-g associated with the destination ID receives the data and/or data message, such sensor/node devices 1006a-g and/or nodes 1002a-g can process or otherwise receive the data, and may not continue to forward the data in the communicative direction. In some embodiments, however, the node 1002*a-g* associated with the destination ID may forward the data nonetheless. Accordingly, in such embodiments, it can be understood that the destination sensor/device/node 1002*a-g* can receive the data message twice, from both directions, and thus the sensor/node device 1006*a-g* and/or node 1002*a-g* can be equipped with intelligence in the form of microprocessor-executable instructions and/or hardware programmable logic, to recognize that the data message with a given message ID is received twice, and such second reception can be discarded. The reception of such second transmission can also indicate integrity of the fiber optic ring 1000. In some embodiments, the sensor/node device 1006*a-g* that transmitted the data/message can ensure that the message is received from the first and second directions along the ring, and can stop further transmission along the ring. Such transmitting sensor/node device 1006*a-g* may provide an alarm if the transmitted message is not received from one and/or both directions. The alarm may be local and/or remotely located, and the alarm may be activated via the ring 1000 and/or communications outside the ring. For example, a node 1002*a-g* that detects the alarm may communicate data to another node 1002*a-g*, where such other node may transmit data outside the ring to cause and/or otherwise announce the alarm and/or alarm condition.

Accordingly, the disclosed methods and systems can also allow the sensor/node devices 1006*a-g* and/or nodes 1002*a-g* to track the receipt of the second transmission, such that a sensor/device that does not receive two transmissions may update a received data message count and/or tracking data and/or provide an alert based on such count/tracking data to indicate a problem with the fiber optic network/ring 1000. In some embodiments, the received data message count/track may be associated with a threshold such that the count can be compared to the threshold to cause an alert. Counts less than the threshold, for example, may not be considered to be indicative of a network failure.

In an embodiment, a sensor/node device 1006*a-g* and/or node 1002*a-g* in the fiber optic ring/network 1000 and/or otherwise in communications with a sensor/device 1006*a-g* in the fiber optic network/ring 1000, can poll the sensor/node devices 1006*a-g* and/or nodes 1002*a-g* to obtain data and/or information related to the received data message counts. Such information can be processed to determine network status.

In one exemplary embodiment that employs at least one smart (network) camera as a node device 1006*a-g*, and as previously provided herein, the camera(s) can have or otherwise be associated with a microprocessor and instructions for facilitating camera control and enhanced camera features such as signal and/or image processing, although other features can be included. The camera can be a digital camera, for example, that can be equipped with instructions to perform data/image processing, including for example, data compression and/or decompression, and/or motion detection. The camera can be configured to pan, tilt, and zoom, and such features can be provided from a remote location through, for example, a console as provided herein. In one embodiment, the camera(s) may also include a light or other illumination source and/or device that can be remotely controlled via the remote console. In an embodiment, the camera can include an internal clock that can allow the image data collected or otherwise stored by the camera to be time and/or date stamped. Image data can additionally include the camera identity and/or camera location. The camera may be a digital 24-bit color camera, and can be powered by battery and/or an external power supply, for example, a DO-160D power supply that can be used on aircraft and at other locations. The camera can also provide for external devices to be connected to the camera to input control or other data to the camera.

The data from a camera(s) (or other such sensor 1006*a-g*) may be processed at the camera to eliminate communications on the fiber optic network/ring, such that "events" may be communicated on the ring, but otherwise, data may be stored locally at the camera or another location until requested from a device that may be located in/on the ring 1000 and/or outside the ring. One example of an "event" may be associated with, for example, an image processing module associated with the camera, where the camera may detect motion at a location where motion may not otherwise be expected. Although the camera may be continually receiving and/or processing image data, such data may not be communicated until such data indicates movement. In some embodiment, data collected by a camera and/or another sensor may be communicated to another location for display and/or processing.

In one embodiment where a display and/or console may be located on the fiber optic network/ring, the camera(s) can provide images to the console at fixed intervals or upon other intervals. The image data can be formatted according to JPEG, motion JPEG, MPEG, AVI, and/or other formats, although such formats are merely for illustration and not limitation, and other image and/or animated formats may be used.

The aforementioned console can thus include a microprocessor and a corresponding display or screen. The exemplary console may thus be understood to be a sensor 1006*a-g* as provided herein, that can include microprocessor-controlled device such as a Personal Computer (PC), although such example is provided for illustration. The console can thus be understood to include at least one microprocessor, memory and/or storage components and devices, an interface for connecting to the network, an interface for connecting to peripheral devices such as external memory, printers, a mouse, keyboard, joystick, or other peripherals. The console may include an integrated flat-panel touch-screen display. The console microprocessor may be operable by program code embodying the Microsoft Windows operating system, for example. The console may be connected to an external power supply, for example, an analog and/or digital power supply, AC and/or DC, and/or for example, a DO-160D power supply. The console may also include a USB, Firewire, Ethernet, and/or another interface for connecting external devices to the console.

The console microprocessor can include one or more command icons that can be, in one embodiment, touch-screen icons, on the console display for controlling the camera, other node devices 1006*a-g*, and the display. For example, command icons may include a light icon, a record icon, a clear icon, and a security icon. Touching the light icon may cause a network data message to be transmitted to a network device/sensor 1006*a-g* (e.g., node 1002*a-g*), where such device/sensor 1006*a-g* (e.g., camera) may interpret the message and provide a command to the illumination source to toggle an associated light on or off, where the light can be associated with a device/sensor 1006*a-g* (e.g., camera) related to the image on the display. As provided previously herein, in some embodiments, the command from the display/command icon may be communicated directly to the illumination source. Touching the record icon may cause the console to record an image stream provided by the camera. Touching the clear icon may cause the display to remove the presented icon(s). Touching the security icon may cause, for example, the console to place one or more of the devices/sensors 1006*a-g* (e.g., cameras) into a motion detection state to record the images provided by such cameras, for example, as further described below, or to record the images at a different rate than previously recorded. A variety of other touch-screen icons and/or commands are also possible based on the embodiment.

The console can be dedicated to presenting image data from a single camera or multiple cameras, and/or other node devices/sensors 1006a-g. Alternately, as described herein, the console microprocessor may simultaneously display images observed by two or more cameras or devices 1006a-g connected to the optical fiber communication network/ring 1000, by allocating portions of the display to the two or more cameras and/or node devices 1006a-g.

The console may provide, for example, a touch-screen interface (although other modes of control (e.g., mouse, keyboard, stylus, etc.) are available) on the display for cycling through touch-screen icons and image data from the camera(s) and/or other devices 1006a-g. For example, as a default condition, the display may present image data observed by one or more cameras 1006a-g. Touching the display in the default condition may cause the console microprocessor to present at least some of the touch-screen icons on the display. Touching the display again may cause the console microprocessor to present an enlarged view of a selected image stream using a command icon. Touching the display again may cause the display microprocessor to return to a simultaneous display of presented images observed by two or more cameras 1006a-g, as indicated above, and as further described below.

The console and camera/node devices 1006a-g may behave according to a client-server relationship. For example, the console microprocessor may instruct the camera to provide images at selected intervals or times to reduce the bandwidth of the perimeter-based monitoring system. As provided previously herein, in one exemplary technique, the console microprocessor may instruct another node device 1006a-g such as a camera to provide image data to the console/display when the camera (e.g., image processing instructions) determines that the images are different from the images observed at a pre-determined earlier time (i.e., a change is detected). In such an embodiment, the camera can thus be equipped with image processing instructions and/or modules that include, for example, image registration and/or segmentation schemes.

The console microprocessor may instruct the camera to provide images at pre-determined time intervals. According to yet an exemplary embodiment, the console microprocessor may instruct the camera to provide images at predetermined time intervals and/or earlier than pre-determined time intervals. For example, if the camera determines prior to the next time interval that the images are different from the images observed at the previous time interval, the camera may provide the images immediately, rather than provide the images at the next time interval. A combination of these techniques may be implemented based on the embodiment.

In one embodiment, the console processor can record images from the camera(s) at the rate of at least approximately 35 frames/second, although such example is provided for illustration, and faster or slower speeds can be used. Additionally, the console microprocessor may provide the images for subsequent downloading to a remote apparatus that can be located outside the ring 1000. For example, as described in further detail below, the display may provide the images for subsequent downloading to an aircraft transceiver, e.g., an aircraft satcom radio, gatelink device, and/or other communications means.

As provided herein, the console can thus include an interface for connecting to or otherwise communicating with external devices (e.g., outside the ring). Such external devices can include other microprocessor-controlled devices that can be configured for communicating with the console, and can communicate via wired and/or wireless communications channels and/or protocols, using one or more intranets and/or the internet. Accordingly, in some embodiments, the ring 1000 may not include a hub or a central network server.

In one exemplary embodiment, the disclosed methods and systems can include an embodiment where the node devices 1006a-g include one or more intelligent remote units (e.g., sensors) that can determine whether a switch (e.g., message switch) or an alarm at a specified location has been tripped. Based on a switch tripping, the node device 1006a-g may provide a signal activating at least one camera, in particular, at least one camera located near the location of the tripped switch or alarm. The node devices 1006a-g and/or the at least one camera may also provide feedback (e.g., visual) to a console as provided herein. The system may include one or more silent alarms which provide feedback to the aforementioned console/display or another device. Non-silent alarms may additionally and/or optionally be used.

The node devices 1006a-g can include a motion detector connected to the fiber optic network/ring 1000. For example, upon detecting motion, the motion detector may provide a signal activating at least one camera, in particular, at least one camera located near the location of the motion detector.

One or more of the node devices 1006a-g on the ring network 1000 can also be associated with an enabling/disabling feature. Accordingly, one or more sensors 1006a-g can be at least partially enable, disabled, and/or otherwise affected based on an input from a user or another, where such input can be provided on the network, and/or otherwise provided at the sensor/node device 1006a-g location. For example, if the sensor is associated with a switch that can indicate that a door opened, an authorized user may provide a personal identification number (PIN), access code/card, biometric data (e.g., facial recognition module associated with a camera), or other data acceptable to enable, disable, and/or otherwise affect the switch sensor 1006a-g such that, for example, an alarm may not be provided as otherwise may be the case, data may not be collected and/or transmitted as may otherwise be the case, and/or the one or more of the sensors 1006a-g may not be "armed," etc. Such enabling and/or disabling can affect one sensor/node device 1006a-g, and/or the same data and/or other data can affect multiple (e.g., all, subset, like sensors, etc.) sensors/node devices 1006a-g in the fiber optic network/ring 1000. Accordingly, the user input data can be provided via one of the sensors/devices 1006a-g and/or through a device associated with one of the sensors 1006a-g, and such user input data can be transmitted through the fiber optic ring/network 1000 as provided herein.

Those of ordinary skill in the art will recognize that the enabling and/or disabling features can similarly be provided by another sensor 1006a-g in the ring, and/or by a tranmission of data/commands from a device outside the ring. In one embodiment, a system for protecting a remote area such as an aircraft cabin can be remotely armed and disarmed through commands and/or passwords that can be used to authenticate the command, and/or can be locally armed and/or disarmed based on the aforementioned PIN, access card/code, biometric data, and/or other data.

Figure 3:
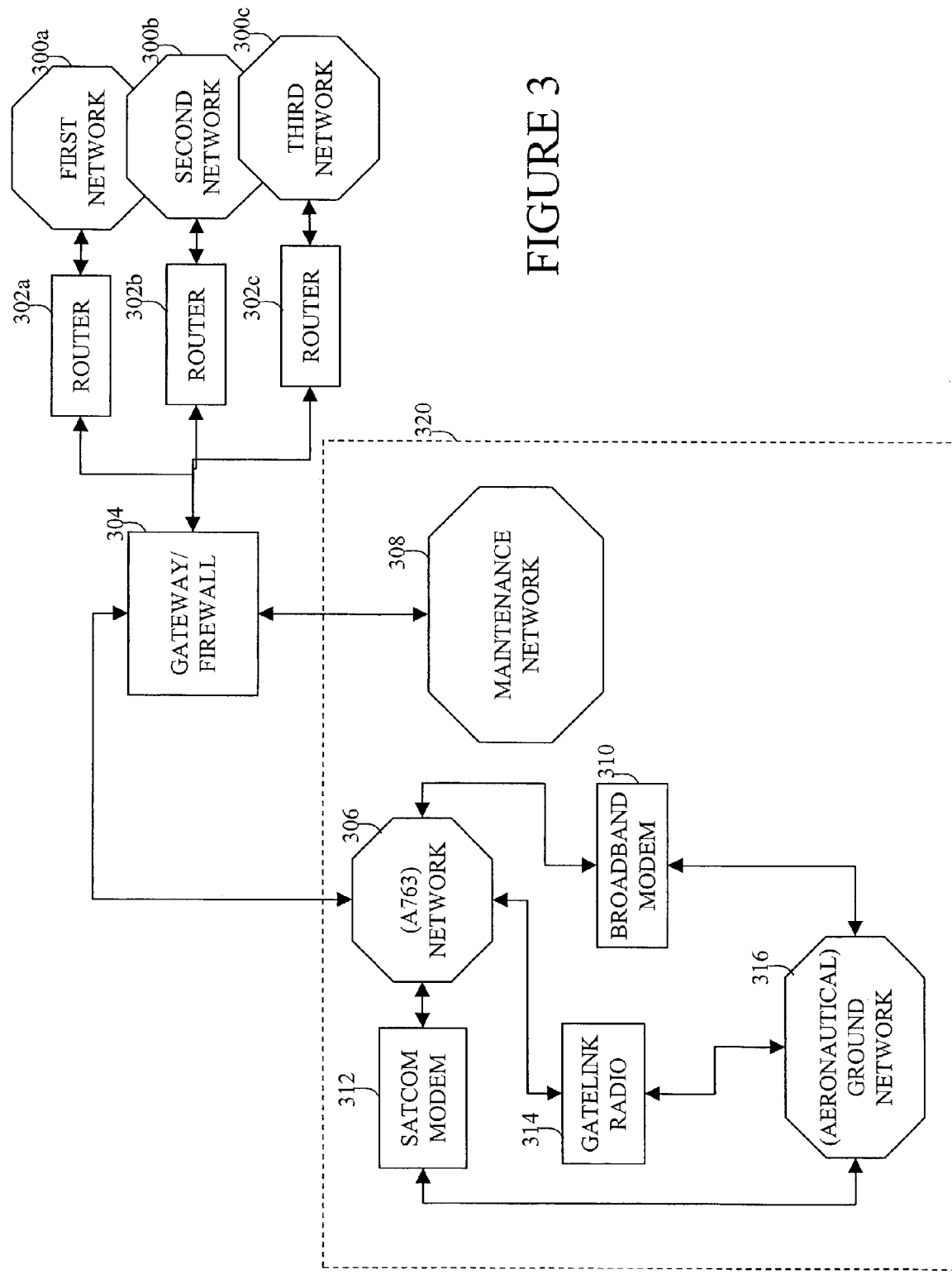
FIG. 3 is an example of multiple fiber rings communicating with other networks.

The disclosed systems and methods can include one or more transponders and/or transceivers connected to the fiber optic communication network/ring 1000. As previously provided herein, the transceivers may communicate information provided by the consoles and/or other sensors/node devices 1006a-g, which information may include image data observed by the camera, or other sensor data, and can include alarm data. The transceiver can be connected to a gateway and/or firewall that can provide access to one or more other networks. With reference to FIG. 3, the disclosed methods and systems can thus include two or more networks 300a-c for perimeter-based monitoring, two or more corresponding routers 302a-c, a hub (e.g., gateway/firewall) 304, and a remote (e.g., global) communications network 320 that can include one or more networks 306, 308, 316 and various interfaces thereto 310, 312, 314. The two or more systems 300a-c may include a combination of cameras, consoles/displays, and/or other intelligent remote units and/or sensors/node devices 1006a-g, as previously provided herein. In some embodiments, some of the systems 300a-c may not include a fiber optic ring 1000. The networks 300a-c may thus monitor different and/or separate locations of interest and provide information associated with that location to the corresponding router. The router 302a-c may be connected to the corresponding fiber optic communication network 300a-c.

As provided herein, the global communications network 320 may include an Ethernet, ATM, or WAN network, or any other communications network known to one of ordinary skill in the art to have a routable and expandable architecture. In such an embodiment, the routers 302a-c and/or hub 304 may be any router known by one of ordinary skill in the art to be suitable for communicating information from an optical fiber communications network to an Ethernet, ATM, WAN, or other suitable network (e.g., internet).

According to an exemplary embodiment, an aircraft security system for perimeter-based monitoring may include consoles/displays, cameras, intelligent remote units, and silent alarms connected to an optical fiber communications network/ring 1000 that may be distributed throughout the body of an aircraft. For example, one or more consoles/displays may be located in the cockpit, one or more cameras or other smart devices may be located in the passenger compartment, the cargo compartment, and/or the wheel well, and one or more intelligent remote units and one or more silent alarms may be located near the forward and aft galleys.

In the exemplary embodiment, the system 1000 may be employed by members of an aircraft flight crew to monitor various locations on the aircraft. The system 1000 can also be employed by members of an aircraft flight crew to record images from various locations on the aircraft. As previously provided herein, the images may be downloaded to an aircraft transceiver to the ground. The one or more silent alarms may be distributed throughout the passenger compartment at concealed locations known only by the flight crew, for example. In such an embodiment, activating the one or more silent alarms may provide a warning to the flight crew of activity in the associated locations. Such alarms may also be provided to a hub 304 and thereafter to a ground network 306/308 to alert appropriate non-aircraft personnel. In one example, an alarm can be used to activate a hijack warning/indication through command to intelligence connected to the aircraft Mode-S and/or other transponder system.

In an exemplary embodiment, an airport network for perimeter-based monitoring may include two or more fiber optic ring systems/networks 300a-c for perimeter-based monitoring disposed at various locations in an airport, two or more corresponding routers 302a-c, a hub 304, and a global combinations network 320. For example, the systems/networks 300a-c may be located at airfields, passenger terminals, and airport perimeters, and the hub 304 may be located at an emergency response location inside the airport, e.g. an airport security office, and/or at an emergency response location outside the airport, e.g. a fire or police department.

The network may be employed by emergency response personnel to monitor various locations in an airport. The network may also be employed by emergency response personnel to record images from various locations in an airport.

According to an exemplary embodiment, a pipeline system for perimeter-based monitoring may include a camera and a console connected to a distributed supervisory control and data acquisition (SCADA) controller. The camera, the console, and/or the SCADA controller may be connected by an optical fiber communication ring/network 1000 as provided herein. Alternately, the camera and the console may be connected by a digital cellular telephone network, where the SCADA sensors/devices and/or controller can be connected using the fiber ring 1000. The camera may be a motion-sensing digitizing camera that monitors activity at the pipeline and provides information to a console/display as provided previously herein. The console/display may be monitored by pipeline personnel. The console microprocessor may have the ability to instruct the camera to override the SCADA controller and execute an emergency shutdown. Alternately, the camera may independently be able to override the SCADA controller upon the happening of a predetermined event, such as a tripped alarm.

Figure 4:
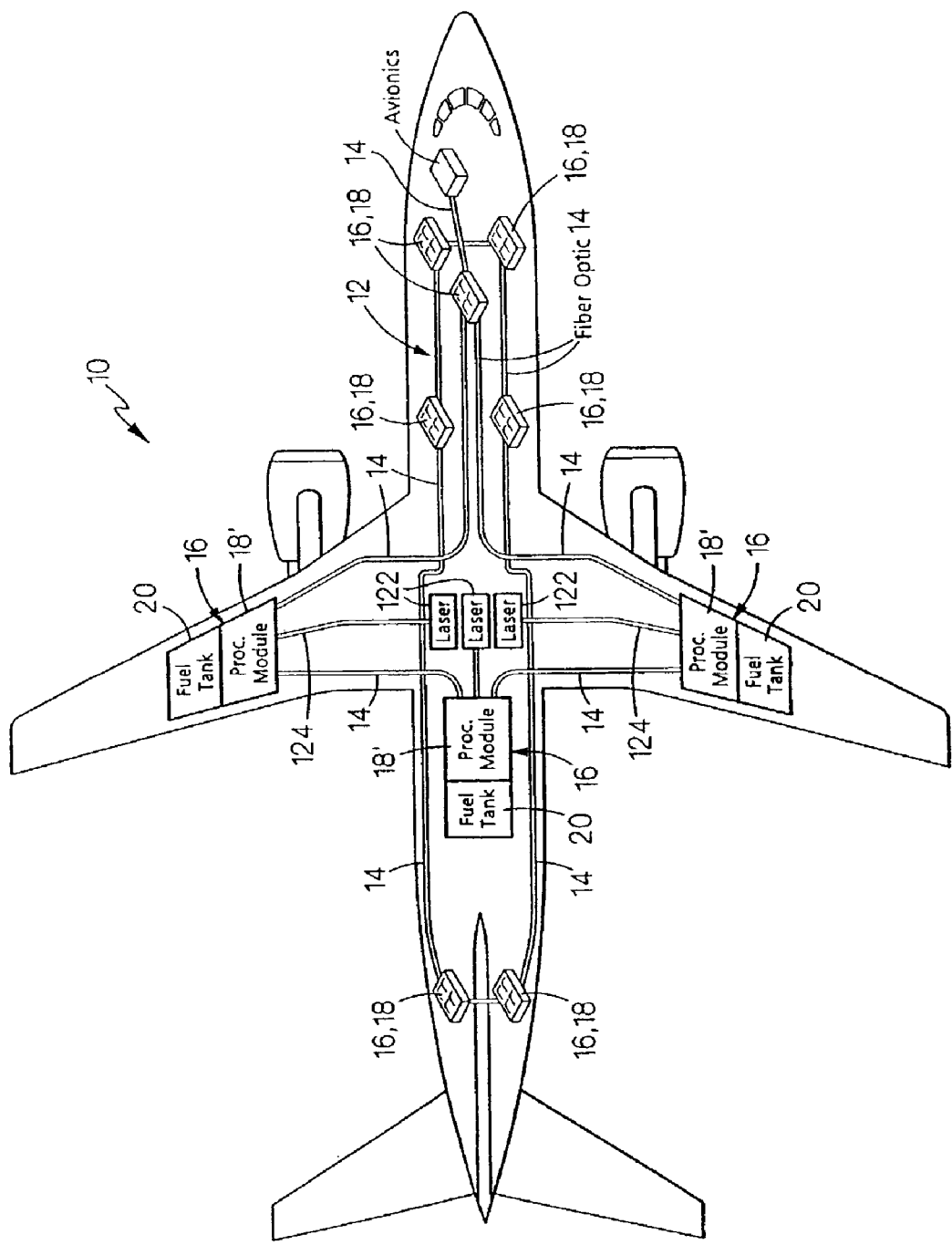
FIG. 4 is a includes a portion of one distributed control system for monitoring fuel tanks in an aircraft, and can be adapted to include an optical communications ring as provided herein.
Figure 5A:
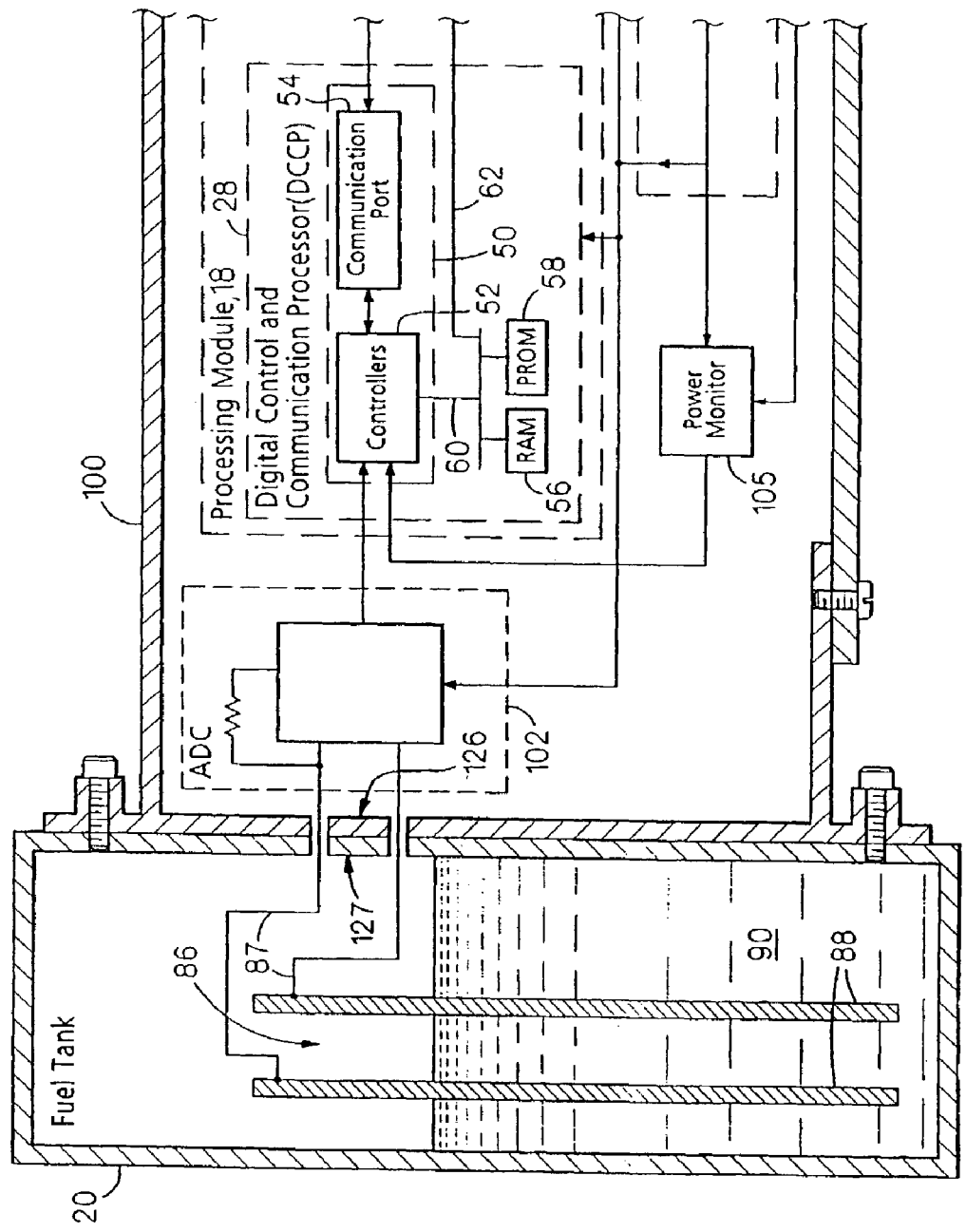
FIG. 5 is a fuel measuring portion of a control system that can be utilized for a system according to FIG. 4.
Figure 5B:
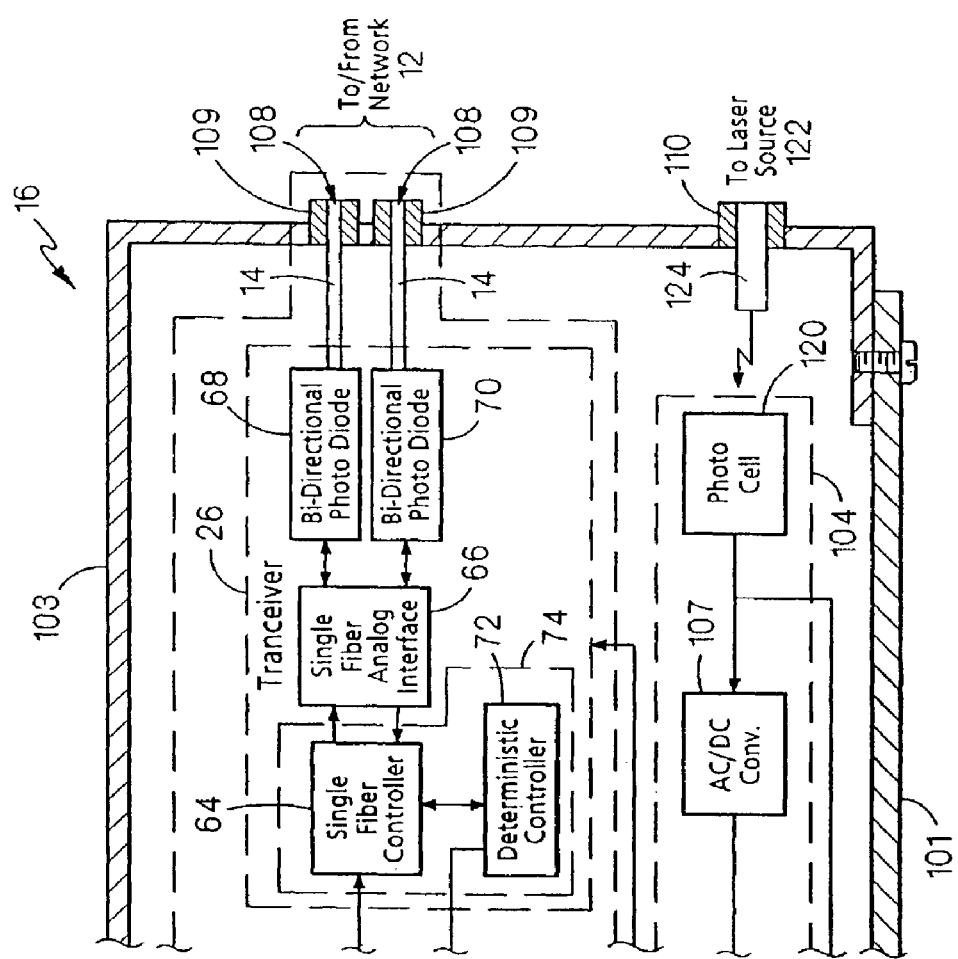

Referring now to FIGS. 4 and 5, and with reference to FIGS. 1 and 2, and according to an exemplary system as provided in U.S. Pat. No. 6,356,809, incorporated herein by reference in its entirety, the disclosed methods and systems can be applied to an aircraft 10 to provide a distributed control system 12 for sensing and control across fiber optic communication media 14 interconnecting intelligent nodes 16. The nodes 16 can be nodes 1002a-g as provided with relation to FIGS. 1 and 2, and can include a digital communication processor and a transceiver, hereinafter sometimes referred to as a processing module 18, that can operate autonomously in relation to modules 18 at other nodes 16. A transceiver in the module 18 can interface with the fiber optic communication media 14. As provided previously herein, the fiber optic communication media 14 can include bi-directional serial data busses, which can be, for example, fiber optic cables.

To increase fault tolerance, two, three, four, or more such bi-directional data buses 14 can be employed between a given two or more of such nodes 18 (see also FIGS. 1 and 2) to, for example, provide for multiple fiber optic rings 1000 between the nodes 18 and/or to provide additional connectivity between certain nodes 18. Redundancy can also be employed in certain intelligent nodes 16 performing activities such as sensor/actuator activities in an aircraft control system. The coupling of the nodes 16 to the serial data buses 14 can be accomplished by transceivers within the modules 18 and a transceiver can be connected to a digital control and communication processor (DCCP) 28 that can be located within the module 18, where the DCCP 28 can otherwise be understood to be a microprocessor with instructions for causing the microprocessor to act and/or perform as provided herein. A transceiver and DCCP 28 combination can be referred to herein as a processing element or module.

FIG. 5 thus shows a fuel tank measurement module for a system 12 such as the system of FIG. 4, although as provided herein, other sensors and/or measurement systems 1006a-g can be employed without departing from the scope of the disclosed methods and systems, and references herein to a fuel tank sensor can be understood to be inclusive of the aforementioned references to a measurement/node device and/or sensor 1006a-g. The processing modules 18 can be incorporated into or otherwise represent a tank wall processor module 100 such that the tank wall processor module 100 can monitor fuel in corresponding fuel tanks 20 of the aircraft 10.

The distributed local intelligent nodes 16, for example, can sense and/or control physical parameters of fuel sensors 86 and employ the communications provided by the serial buses 14.

Figure 6:
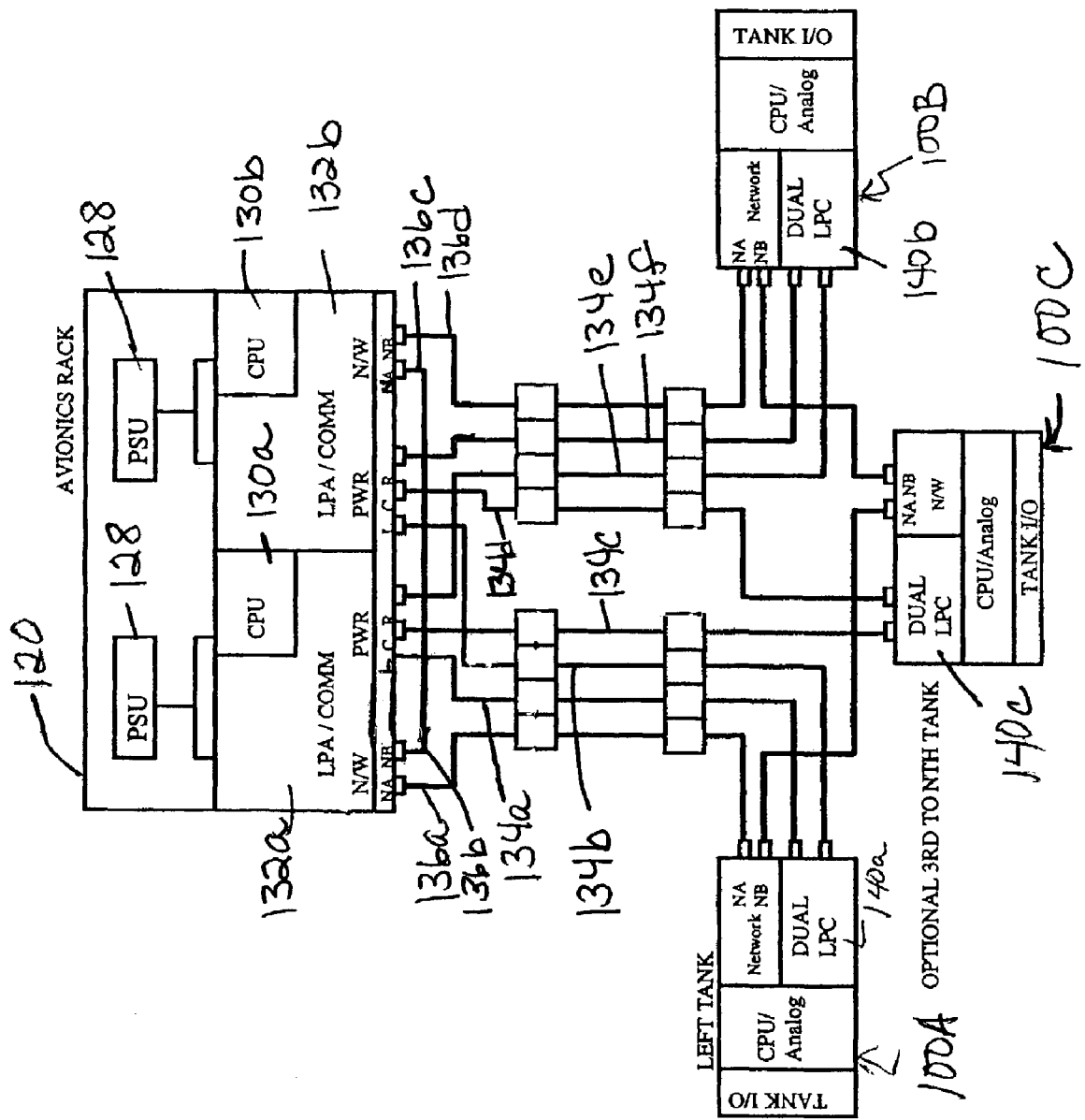
FIG. 6 is a system architecture for one system that can be employed according to FIGS. 4 and 5 that employs an optical communications ring; and, FIG. 7 is another embodiment of a system for providing distributed control that can employ an optical communications ring as provided herein.

Referring now to FIG. 6, an arrangement is shown for an aircraft 10 having "left", "right", and "center" fuel tanks (not shown) with corresponding left 100a, right 100b, and center 100c tank wall processor modules. Those of ordinary skill will recognize that the FIG. 6 system is merely illustrative of one embodiment and/or a portion of one embodiment that can include three (3) fuel tanks, and that the disclosed methods and systems can be extended and/or reduced to another number of fuel tanks. Similarly, the names of "left," "center," and "right" are merely for convenience.

In the FIG. 6 system, the tank wall processor modules 100a-c can be mounted to the respective fuel tanks 20, and thus the tank wall processor modules 100a-c may be physically mounted to the fuel tank wall, in proximity to the fuel tank wall, and/or otherwise in communications with the fuel tank wall. As shown in FIG. 4, and with reference to FIGS. 5 and 6, avionics associated with aircraft can include electronics (see FIG. 4, and "avionics rack," FIG. 6) 120 that can be located, for example, in an avionics bay or another location, where the avionics rack can include one or more power supply units 128 for providing power for one or more control processor units (CPUs) 130a-b and/or one or more laser power diodes 132a-b. The laser power diodes/amplifiers 132a-b can include and/or interface to the bi-directional fiber optic cables 14 connecting the avionics electronics 120 to the tank wall processor modules 100a-c at the fuel tanks 20.

In the FIG. 6 embodiment that represents an embodiment having three fuel tanks 20, the laser power diodes/amplifiers 132a-b can interface to three (or more) fiber optic cables 134a-c, 134d-f, respectively, where a corresponding one of such three fiber optic cables 134a-c from the laser power amplifiers 132a-b can provide an optical power link between the respective laser power diodes/amplifiers 132a-b and one of the tank wall processor modules 100a-c. Such optical power link from the laser power diodes/amplifiers 132a-b to the tank wall processors 100a-c can be allowed to transfer energy to a laser power converter module 140a-c of the respective tank wall processors 100a-c such that the laser power converter modules 140a-c may receive the energy from a laser power diodes/amplifiers 132a-b and convert such received optical laser energy to electrical energy to provide power to the respective components of the tank wall processor module 100a-c. Accordingly, the FIG. 6 embodiment which allows an optical power link 134a-d, 134d-f between at least two laser power amplifiers 132a-b to a respective tank wall processor 100a-c allows for power redundancy and decreased faults from power failures. Additionally and/or optionally, the dual optical power connections may allow for an increased electrical energy/power to the processor module 100a-c, for example, by providing parallel power inputs that can be combined by the tank wall processor module 100a-c.

With continuing reference to FIGS. 5 and 6, the illustrative embodiment of the tank wall processors 100a-c include a digital control and communication processor (DCCP) 28 that includes a communications port 54 for communicating network and other data (e.g., sensors and control device data) between one or more processors in the tank wall processor modules 100a-c and the avionics electronics 120. For example, at least some of the communicated data can be based on measurements from the fuel tank 20.

Accordingly, in the embodiment of FIGS. 5 and 6, a signal converter 102 within the respective tank wall processor modules 100a-c can receive signals and/or data based on sensors in the fuel tank 20 and convert the signals/data for the DCCP 28. In one embodiment, the signal converter 102 can convert an analog signal to a digital signal, and/or the signal converter 102 can otherwise condition the signals/data (e.g., filter, amplify, etc.) for the DCCP 28 where the received signals can be analog or digital. The DCCP 28 can cause the data to be transmitted to the avionics electronics 120 via one or more communications ports 54, where such data communications can employ one or more networking protocols for facilitating a digital transmission of data. The communications port 54 can thus include a conversion from electrical energy to optical energy.

As shown in the FIG. 6 embodiment, the avionics electronics 120 can include one or more (e.g., two illustrated) network channels 136a-b, 136c-d (shown in FIG. 1 as 14) that can be connected in a daisy chain and/or fiber optic ring configuration 1000 (see also FIGS. 1 and 2) that can include the network interfaces 132a-b and the three tank wall processor modules 100a-c as the sensors/devices as shown in FIGS. 1 and 2. Accordingly, with reference to FIG. 6, a first network interface 132a can communicate directly to the left tank wall processor module 100a via a first communicative link 136a, and/or the first network interface may communicate to the left tank wall processor module 100a via a second communicative link 136b that can include communications to a second network interface's 132b first communicative link 136c, the second network interface's 132b second communicative link 136d, and thereafter communications to the right tank wall processor module 100b, center tank wall processor module 100c, and thereafter to the left tank wall processor module 100a. In the illustrated system, the fiber communications data link can employ a Fieldbus (e.g., LonWorks) or Ethernet protocol, although those of ordinary skill in the art will recognize that the methods and systems are not limited to such a protocol, and that other protocols that may be proprietary, standard, or otherwise known, can be used.

Figure 7:
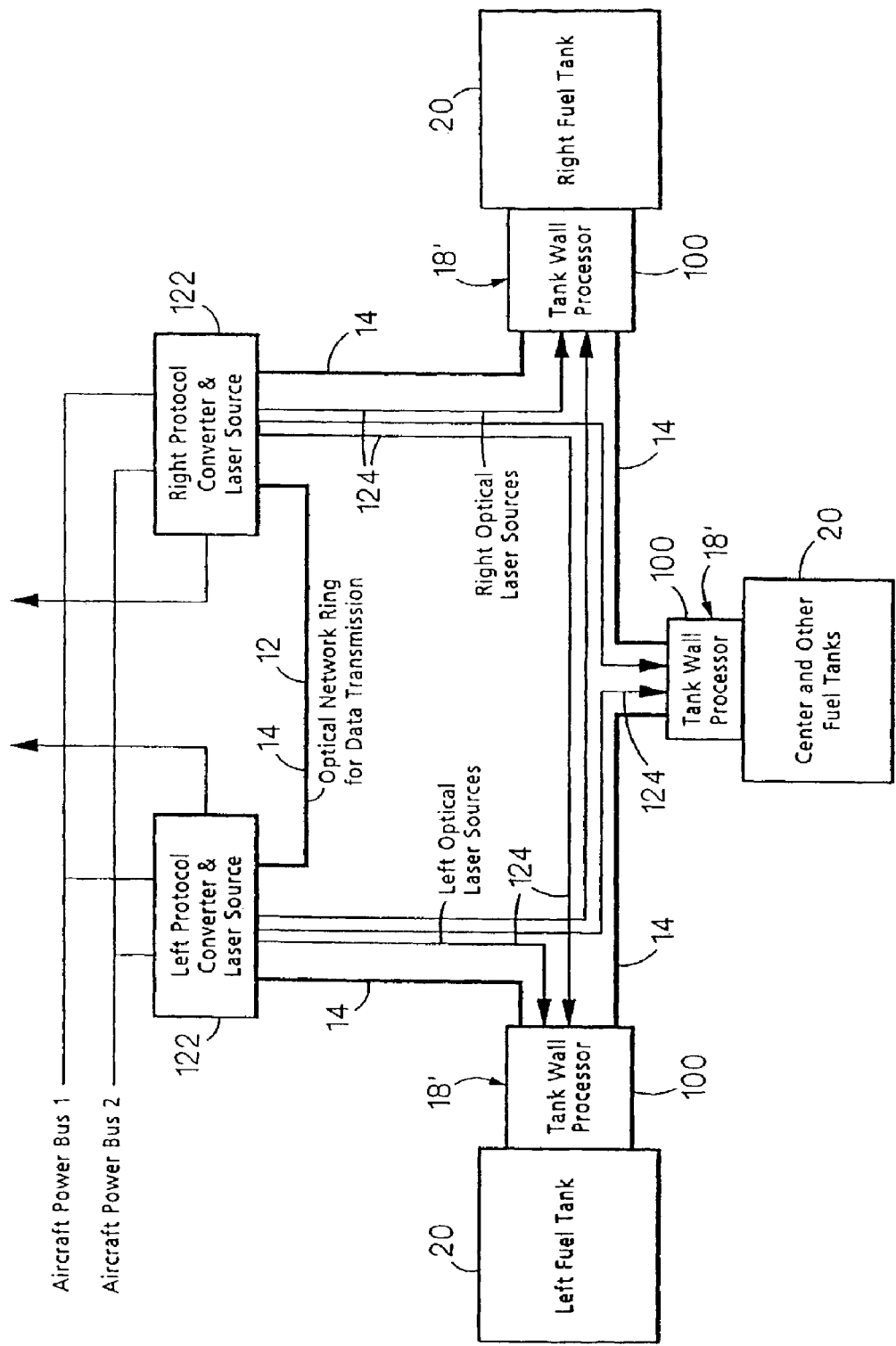

FIG. 7 provides another illustrative embodiment of the methods and systems illustrated in FIG. 6.

With reference to FIGS. 1 and 2, in some embodiments, the transmission of fiber optic energy to provide power to the sensors 1006a-g and/or nodes 1002a-g can be provided in a ring architecture 1000 as is the illustrated data communications between nodes 1002a-g.

The methods and systems described herein are not limited to a particular hardware or software configuration, and may find applicability in many computing or processing environments. The methods and systems can be implemented in hardware or software, or a combination of hardware and software. The methods and systems can be implemented in one or more computer programs, where a computer program can be understood to include one or more processor executable instructions. The computer program(s) can execute on one or more programmable processors, and can be stored on one or more storage medium readable by the processor (including volatile and non-volatile memory and/or storage elements), one or more input devices, and/or one or more output devices. The processor thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted.

As provided herein, the processor(s) can thus be embedded in one or more devices that can be operated independently or together in a networked environment, where the network can include, for example, a Local Area Network (LAN), wide area network (WAN), and/or can include an intranet and/or the internet and/or another network. The network(s) can be wired or wireless or a combination thereof and can use one or more communications protocols to facilitate communications between the different processors. The processors can be configured for distributed processing and can utilize, in some embodiments, a client-server model as needed. Accordingly, the methods and systems can utilize multiple processors and/or processor devices, and the processor instructions can be divided amongst such single or multiple processor/devices.

The device(s) or computer systems that integrate with the processor(s) can include, for example, a personal computer(s), workstation (e.g., Sun, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a microprocessor" and "a processor", or "the microprocessor" and "the processor," can be understood to include one or more microprocessors that can communicate in a stand-alone and/or a distributed environment(s), and can thus can be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network using a variety of communications protocols, and unless otherwise specified, can be arranged to include a combination of external and internal memory devices, where such memory can be contiguous and/or partitioned based on the application. Accordingly, references to a database can be understood to include one or more memory associations, where such references can include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, can include one or more intranets and/or the internet. References herein to microprocessor instructions or microprocessor-executable instructions, in accordance with the above, can be understood to include programmable hardware.

Although the methods and systems have been described relative to a specific embodiment thereof, they are not so limited. Obviously many modifications and variations may become apparent in light of the above teachings. For example, although the methods and systems are describe relative to a fiber optic architecture, other communications channels such as wired, wireless, and copper communications channels can be used. Although some of the features are described as being implemented by microprocessor-executable instructions, those of ordinary skill in the art will recognize that the same features may be implemented in hardware via programmable hardware. Many additional changes in the details, materials, and arrangement of parts, herein described and illustrated, can be made by those skilled in the art.

What is claimed is:

1. A system, comprising:
   at least one fiber optic ring network, the fiber optic ring network including at least two microprocessor-controlled devices, the at least two microprocessor-controlled devices including at least a first microprocessor-controlled device and a distinct second microprocessor-controlled device, and at least two bi-directional fiber optic cables which connect the at least two microprocessor-controlled devices in a communicative, daisy-chain ring having a first and a second communicative direction, where the first microprocessor-controlled device and the distinct second microprocessor-controlled device are adapted to communicate via the at least two bidirectional fiber optic cables; and
   a second network remote from the fiber optic ring network, the second network being interfaced with the fiber optic ring network.

2. A system according to claim 1, wherein:
   the fiber optic ring includes a first communicative direction and a second communicative direction;
   the at least two microprocessor-controlled devices are adapted to communicate data along the first and the second communicative directions, the data identifying at least one of: (a) the one or more of the microprocessor-controlled devices which is the source of the data; (b) the one or more of the microprocessor-controlled devices which is the destination for the data; and (c) the direction in which the data is received along the ring; and
   at least one of the microprocessor-controlled devices is adapted to be responsive to the data.

3. A system according to claim 2, where the at least two microprocessor-controlled devices are adapted to be responsive to with microprocessor instructions to transmit data in the first and second directions along the ring.

4. A system according to claim 1, further comprising an interface between the at least two microprocessor controlled devices and the at least two bi-directional fiber optic cables.

5. A system according to claim 4, where the interface includes an electro-optical device.

6. A system according to claim 4, where the interface includes a photodiode.

7. A system according to claim 1, where the at least two microprocessor controlled devices include at least one of: a processing system, a measurement system, an imaging system, a sensor, a mechanical sensor, an analog sensor, a digital sensor, a fiber optic sensor, a video sensor, a camera, a fuel tank sensor, and an infrared sensor.

8. A system according to claim 1, where the system is adapted to transmit the communications in accordance with at least one of: TCP/IP, Ethernet, and a fieldbus protocol.

9. A system according to claim 1, further including at least two power supplies, the at least two power supplies having a communicative connection to at least one of the at least two microprocessor controlled devices.

10. A system according to claim 9, where the at least two power supplies include laser power diodes, and where the communicative connection includes a fiber optic cable.

11. A system according to claim 1, where the at least two microprocessor-controlled devices are adapted to be responsive to with microprocessor instructions and are adapted to track received data messages.

12. A system according to claim 11, where the system is adapted to be responsive to the at least two microprocessor instructions, based on the tracked data messages, to transmit at least one of: an alarm message along the ring, and an alarm message outside the ring.

13. A system according to claim 1, where at least one of the at least two microprocessor controlled devices is adapted to communicate with at least one microprocessor-controlled device outside the ring.

14. A system according to claim 13, where the communications include at least one of wired and wireless communications.

15. A system according to claim 13, where the communications include satellite, internet, Ethernet, cellular, network, and USB.

16. A system according to claim 1 where, the at least two microprocessor controlled devices include:
- at least one camera, at least one switch, at least one fuel tank sensor, and at least one microprocessor-controlled device having a display; and
- at least two bi-directional fiber optic cables to provide a communicative ring amongst the at least two microprocessor-controlled devices by connecting the at least two microprocessor-controlled devices in a daisy-chain, where the at least two microprocessor-controlled devices communicate optical data via at least two of the bi-directional fiber optic cables.

17. A system according to claim 16, further including at least one illumination source for at least one of the at least two microprocessor controlled devices.

18. A system according to claim 16, where at least one of the at least two microprocessor controlled devices is at least one of: partially enabled and partially disabled, based on a user input.

19. A system according to claim 18, where the user input includes at least one of: personal identification number (PIN), an access code, an access card, and biometric data.

20. A system according to claim 16, further including at least one illumination source for the camera.

21. A system according to claim 20, where the at least one illumination source is adapted to be activated from the at least one display.

22. A system according to claim 20, where the at least one illumination source is adapted to be activated based on data from the at least one camera.

23. A system according to claim 20, where the at least one camera is adapted to be responsive to microprocessor-executable instructions for detecting motion, and where the at least one camera is adapted to provide image data to the at least one microprocessor device having the display when motion is detected.

24. A system according to claim 16, where at least one of the at least one camera is a video camera.

25. A system according to claim 16, where at least one of the at least one switch is a message switch.

* * * * *